(12) United States Patent
Sarbaz et al.

(10) Patent No.: US 7,036,736 B2
(45) Date of Patent: May 2, 2006

(54) EVENT ENTRY AND ADVERTISING MEDIUM

(76) Inventors: Hoss Sarbaz, 1131 Buckingham Dr., #5, Costa Mesa, CA (US) 92626; Shea McIntee, 6522 Shenlyn Dr., Huntington Beach, CA (US) 92679

( * ) Notice: Subject to any disclaimer, the term of this patent is extended or adjusted under 35 U.S.C. 154(b) by 476 days.

(21) Appl. No.: 10/338,458

(22) Filed: Jan. 8, 2003

(65) Prior Publication Data

US 2004/0130142 A1   Jul. 8, 2004

(51) Int. Cl.
*G06K 7/10* (2006.01)
(52) U.S. Cl. .................. 235/462.01; 235/487
(58) Field of Classification Search .......... 235/262.01, 235/382, 385, 487
See application file for complete search history.

(56) References Cited

U.S. PATENT DOCUMENTS

| | | | |
|---|---|---|---|
| 4,493,103 A | 1/1985 | Yamashita et al. | |
| 4,774,618 A | 9/1988 | Raviv | |
| 4,903,255 A | 2/1990 | Sugaya et al. | |
| 4,904,853 A | 2/1990 | Yokokawa | |
| 5,218,599 A | 6/1993 | Tsuyoshi et al. | |
| 5,493,105 A | 2/1996 | Desai | |
| 5,915,007 A | 6/1999 | Klapka | |
| 5,943,651 A | 8/1999 | Oosawa | |
| 5,974,398 A | 10/1999 | Hanson et al. | |
| 5,987,420 A | 11/1999 | Maeda et al. | |
| 5,992,888 A | 11/1999 | North et al. | |
| 6,003,776 A | 12/1999 | Drupsteen | |
| 6,011,677 A | 1/2000 | Rose | |
| 6,016,298 A | 1/2000 | Fischer | |
| 6,035,280 A | 3/2000 | Christensen | |
| 6,068,183 A | 5/2000 | Freeman et al. | |
| 6,078,557 A | 6/2000 | Pierson | |
| 6,089,459 A | 7/2000 | Eisele et al. | |
| D429,723 S | 8/2000 | Yang | |
| 6,119,945 A | 9/2000 | Muller et al. | |
| 6,122,145 A | 9/2000 | Hoyle | |
| 6,157,923 A | 12/2000 | Ivler et al. | |
| 6,160,888 A | 12/2000 | Gotoh et al. | |
| 6,216,112 B1 | 4/2001 | Fuller et al. | |
| 6,237,961 B1 | 5/2001 | Trifanescu | |
| 6,243,345 B1 * | 6/2001 | Kwang | 369/72 |
| 6,288,996 B1 * | 9/2001 | Siegel | 369/273 |
| 6,415,976 B1 * | 7/2002 | Flynn et al. | 229/71 |
| 6,884,504 B1 * | 4/2005 | Liu et al. | 428/343 |

FOREIGN PATENT DOCUMENTS

| | | |
|---|---|---|
| GB | 2 331 959 A | 6/1999 |
| JP | 04040586 A | 2/1992 |
| JP | 05151570 A | 6/1993 |
| WO | WO 99/09554 | 2/1999 |
| WO | WO 00/08646 | 2/2000 |

\* cited by examiner

*Primary Examiner*—Daniel St.Cyr
(74) *Attorney, Agent, or Firm*—Fulwider Patton LLP

(57) ABSTRACT

An event entry and advertising medium including a carrier positioning an indicia receiving surface with visually perceptible indicia including a ticket component for gaining access to an event and a machine readable surface wherein digital data elements including at least one selectively positioned advertising element are encoded to be decoded in an optical disc reader to provide the advertising element to the user.

32 Claims, 8 Drawing Sheets

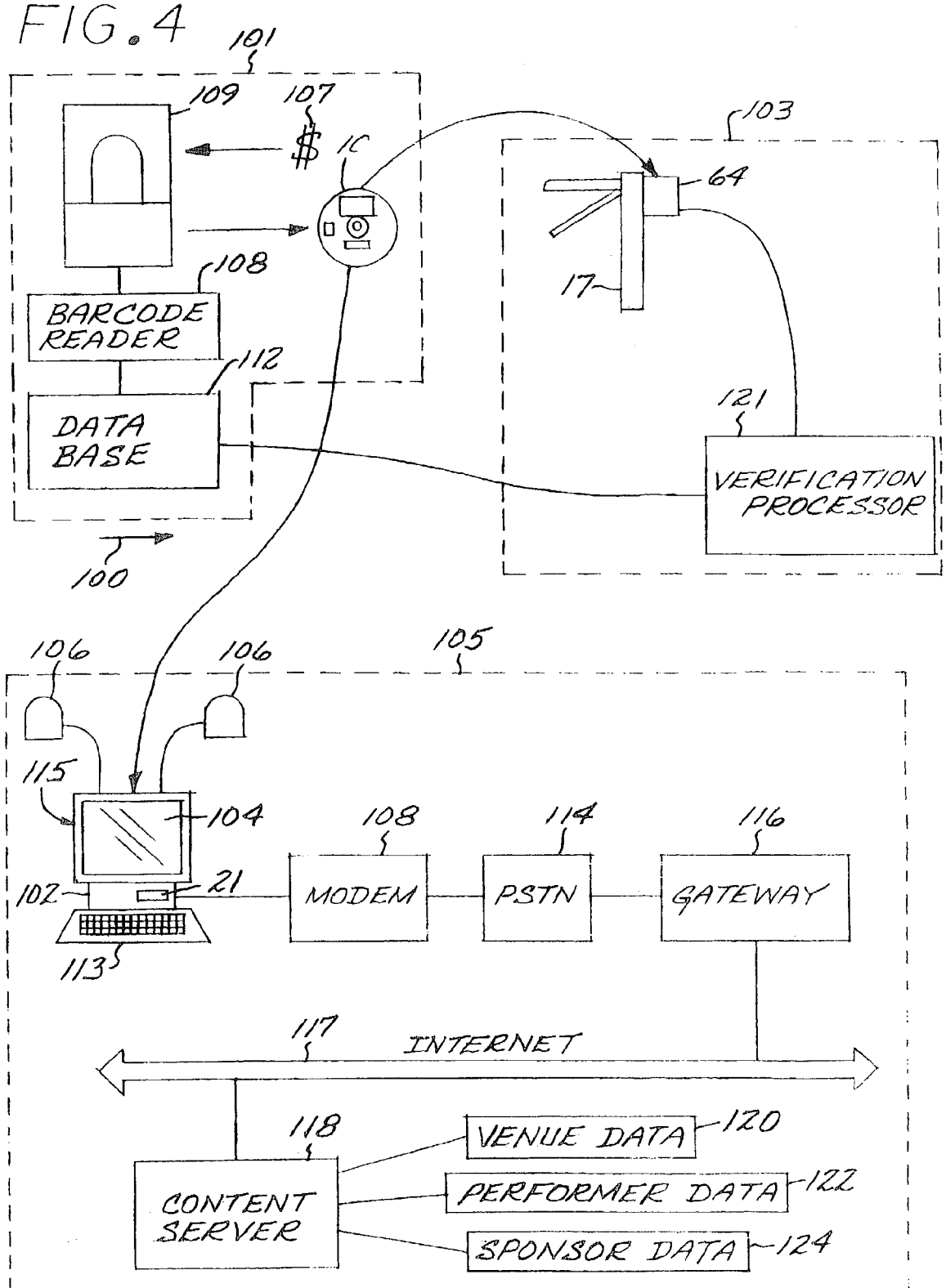

FIG. 9

- 36 — EVENT TITLE: _____
- 38 — VENUE LOCATION: _____
- 40 — EVENT TIME & DATE: _____
- 42 — SEATING: SECTION ___ ROW ___ SEAT ___
  - 44, 46, 48
- 50 — TICKET PRICE: _____

- 161 — VENUE INFO.
- 162
- 164, 166, 168
- 160, 170, 172

FIG. 10a

- 900 — BANNER — 162 = $$$

- 180
- 181 — SPONSOR INFO.
- 182, 184 (boxes 1–n)

EVENT ENTRY AND ADVERTISING MEDIUM

FIELD OF THE INVENTION

The invention relates to advertising practices and more specifically, to advertising used in conjunction with an event entry medium.

BACKGROUND OF THE INVENTION

Entertainment related events such as concerts, plays, musicals, sporting events, movies, and other forms of entertainment or informational exchange based events such as trade shows typically require some representative token for gaining access to the venue hosting the event. To gain access to the event, the overwhelming medium currently in use is the paper ticket. Such paper tickets are purchased from a ticket broker over the phone or local ticket counter or at the box office window of the event venue itself. In exchange for some form of currency or credit, the ticket issuer will provide a paper ticket to the event. The paper ticket typically includes a printed side having information relating to the event title, location, time, and seating arrangement. Often the ticket includes basic printed advertising in the form of logos representing the ticket issuer and select event sponsors. The ticket is usually comprised of a first portion and a second portion in the form of a tear off stub which is taken from the ticket holder upon entry to the venue as proof of entry into the venue.

In addition to providing event entry management, such events are usually heavily sponsored to help manage the costs in producing the event. Thus, in leading up the sponsored event, advertising often takes many forms including television and radio commercials, printed media, billboards, and the like. In addition, promotional gimmicks such as flyers, key chains, and the like are frequently distributed prior to and at the event. For example, one popular advertising gimmick is providing sponsorship information on a compact disc (CD) jacket for a CD containing audio tracks and handing these out at the venue or other promotional location. In addition, once at the event, the event goer is further presented with vendors selling memorabilia of the event as well as sponsored advertising situated all around the venue.

Typically, however, the paper tickets are either disposed of after the event or placed in some keepsake storage with little or no additional viewing. The ticket itself, as a means of access, has performed its role, and thus, there is no particular reason to view the ticket after the event except for possible sentimental reasons. Any advertising provided on the ticket is then seldom if ever viewed. Likewise, the novelty of the promotional gimmick frequently wears off immediately or after a short period of time creating a significant likelihood that the gimmick and its associated advertising will not be viewed again by the gimmick holder.

With the costs of promoting and providing events continuously rising, event promoters are constantly seeking new methods for improving the amount of advertising revenue that is generated to keep ticket prices at a reasonable level to attract significant audiences. What is needed and heretofore unavailable is a medium facilitating event access while providing alternative advertising positioning for generating additional revenues.

SUMMARY OF THE INVENTION

In accordance with a preferred embodiment of the present invention, an event entry and advertising medium for securing access to an event includes a first surface with an indicia receiving region including a ticket component and a second surface having a machine readable region digitally encoded with a plurality of event related elements and at least one advertising element with a carrier positioning the first and second surfaces in an overlying arrangement. The ticket component is selectively presentable for presentation at said entry point to gain access to the preselected event while the machine readable region is selectively positionable within a decoder device to decode the digitally encoded elements to display a layout of event related and advertising elements on a display device.

Another feature of the present invention is the inclusion of an advertising component, authentication component, or instruction component on said first surface in addition to the instruction component.

Yet another feature of the present invention is that the carrier and first and second surfaces form an integral disc body.

In another embodiment of the present invention, a sleeve for receiving a ticket component is located on the first surface and includes a window for viewing the ticket component stored therein.

In yet another embodiment of the present invention, the carrier may be a foldable packet with first and second pockets for receiving the first and second surfaces.

Also featured in the present invention is the incorporation of removable breakaway ticket portions for indicating access to the event has been granted.

Another embodiment of the present invention may incorporate a carrier of an irregular shape which may be used in conjunction with a complementary platter for placement in a conventional optical disc reader.

Another feature of the present invention includes a program and database loaded with the event related elements and advertising elements encoded in the machine readable region.

An additional feature of the present invention includes updating the event related and advertising elements which may be in the form of text, audio, graphics, animation, video, or other multimedia format and downloadable from a remote site.

A method for creating an optical disc ticket including advertising elements is described herein. A method for gaining access to an event using an optical disc ticket is also disclosed herein as is a method for controlling access to an event. A method for accessing the information stored in the machine readable region is also provided herein.

Other features and advantages of the present invention will become more apparent from the following detailed description of the invention, when taken in conjunction with the accompanying exemplary drawings.

BRIEF DESCRIPTION OF THE DRAWINGS

FIG. 3b is an exemplary display page of the expanded elements resulting from a selection of the performer link in FIG. 3a;

FIG. 4 is a schematic of the optical disc ticket system for use with the optical disc ticket illustrated in FIG. 1;

FIG. 9 is an exploded view of the ticket component incorporated in the optical disc ticket illustrated in FIG. 1;

FIG. 10 is an exemplary display page resulting from a selection of the venue link in FIG. 3a;

FIG. 10a is a schematic of an exemplary sponsor advertising component from FIG. 10;

FIG. 10b is a schematic of another exemplary sponsor advertising component from FIG. 10;

FIG. 10c is a schematic of a third exemplary sponsor advertising component from FIG. 10; and FIG. 11 is an exemplary display page resulting from a selection of the sponsor link in FIG. 3a.

DETAILED DESCRIPTION OF THE PREFERRED EMBODIMENTS

Figure 1:
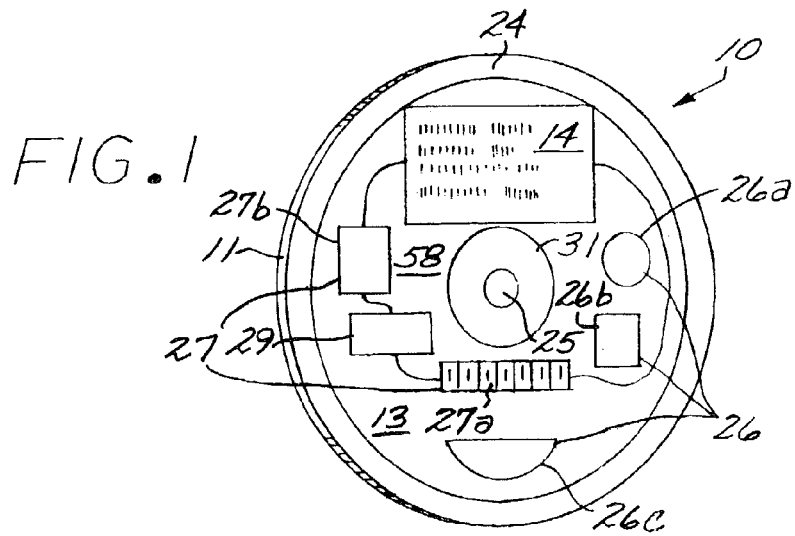
FIG. 1 is a top view of a preferred embodiment of the optical disc ticket of the present invention.

Referring now to FIGS. 1 and 4, an exemplary embodiment of an advertising medium for gaining access to an event at a point of entry according to the present invention is illustrated in the form of a two sided optical disc ticket, generally designated 10. As will be appreciated from further reading, the optical disc ticket 10 may be used in a system such as that illustrated in FIG. 4 and generally designated 100 to provide a convenient means for gaining entry into a preselected event while providing a versatile advertising medium useful both prior to and after the event.

Figure 2:
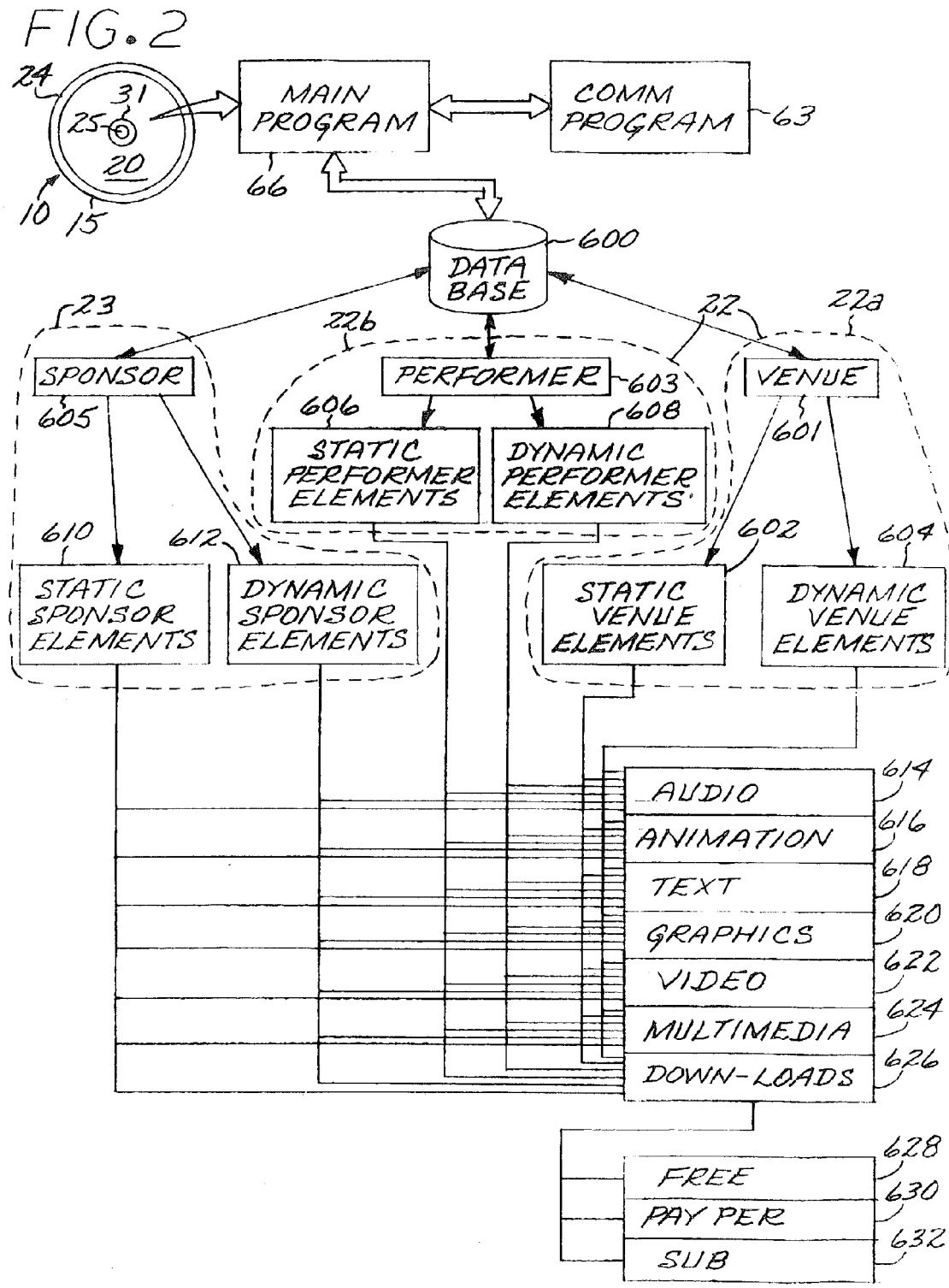
FIG. 2 is a schematic block diagram illustrating an exemplary set of digital contents encoded in the optical storage region on the bottom side of the optical disc ticket of FIG. 1, with the bottom side view of the disc ticket shown in reduced scale.

With continued reference to FIGS. 1 and 4 and also turning to FIG. 2, in general terms, the optical disc ticket 10 includes a main disc body 11 having a first side 12 defining an indicia receiving surface 13 with visually perceptible indicia including a ticket component 14 for presenting at a point of entry 17 (FIG. 4) to gain event access. Such disc body 11 is further configured on its reverse side 15 with a second surface defining a machine readable region 20 storing digitally encoded event related elements 22 (FIG. 2) and one or more selectively positioned advertising elements 23 as determined by a bidding process and accessible through system 100.

In this exemplary embodiment, the optical disc ticket 10 is a convention circular, single-sided, compact disc (CD) such as a CD-ROM with a 650–680 MB digital storage capacity. Using conventional optical disc manufacturing technologies, the main disc body 11 of the disc ticket is manufactured with a polycarbonate substrate over which the indicia receiving surface 13 and optical storage surface, which defines the machine readable region 20, are prepared on opposing sides 12 and 15, respectively, leaving only a relatively thin marginal area 24 and a central unused area 31 adjacent and concentrically aligned with a central aperture 25 on both sides of the optical disc ticket 10. In this embodiment, the main disc body provides a convenient carrier for both the indicia receiving surface and optical storage surface.

With continued reference to FIG. 1, the indicia receiving surface 13 on the first side 12 of the disc 10 covers all but the relatively thin marginal area 24, central area 31, and central aperture 25. Such indicia receiving surface 13 either directly overlays the polycarbonate substrate layer or an intermediate layer and is selected to receive any type of indicia as commonly placed on CDs by such processes as screen printing or other suitable indicia placement methods. Alternatively, the indicia receiving surface may be in the form of a sticker with pressure sensitive adhesive backing and pre-cut with a matching aperture to overlay the first side 12 of the disc ticket 10.

Continuing with FIG. 1, in this exemplary embodiment, the indicia receiving surface 13 of the optical disc ticket 10 has four visually perceptible components juxtaposed to one another including the ticket component 14, an advertising component 26, an authentication component 27, and an instruction component 29. Each of these components contributes to the overall appearance of the first side 12 of the disc ticket 10 and may be arranged in any suitable manner to provide a pleasing aesthetic appearance or a standardized appearance. The ticket component 14 is the principle feature on the indicia receiving surface 13 and may be positioned at any location on the indicia receiving surface. In this example as illustrated in FIG. 1, the ticket component 14 is positioned between the marginal edge 24 of the disc ticket 10 and the central area 31 within a bordered rectangle to offset the ticket component from the other three components 26, 27, and 29.

Turning now to FIG. 9, the exemplary ticket component 14 includes an event title 36, venue location identifier 38, event time and date 40, a seating arrangement 42, and ticket price 50 arranged in a left justified alignment. The seating arrangement includes a section number 44, row number 46, and seat number 48 or other suitable seat identifier corresponding to the venue seating arrangement. Such ticket component is preferably sized so that such ticket related information can be read without optical assistance while covering a minimal amount of space on the indicia receiving surface 13 thereby leaving the remainder of the surface 13 free primarily for the advertising component 26. It will be appreciated that other suitable arrangements which are visually perceptible may also be used.

Turning back to FIG. 1, further disposed on the indicia receiving surface 13 proximate the ticket component 14 is the visually perceptible advertising component 26 which further contributes to the appearance of the first side 12 of the disc 10. Providing an additional advertising avenue to the machine readable advertising described below, the visually perceptible advertising component may incorporate advertising from more than one source. Such advertising component 26 includes a sponsor ad element 26a for promoting a selected sponsor, a performer ad element 26b for 0 promoting the performer, and a venue ad element 26c for promoting the venue, all of which overlie or partially overlie a background element 58. The sponsor ad element 26a typically includes any advertising or promotional associations purchased by a preselected sponsor of the event in the form of logos, designs, and other advertising features for associating the sponsor with the event. Performer ad element 26*b* includes such indicia, for example, as the performer's name and photographs while the venue ad element 26*c* may be a logo, title, or venue illustration for example. It will be appreciated that generic symbols are used in FIG. 1 and throughout the remaining figures and are not meant to be limiting in any manner.

Still referring to FIG. 1, the background element 58 is illustrated as a simple abstract shape but is typically a graphical or textual image relating to any one of the other visual ad elements 26*a*, 26*b*, and 26*c*. For example, the background element may be an album cover or tour design illustration with the ticket component 14 and other ad elements 26*a*, 26*b*, and 26*c* superimposed thereupon. Such background component underlies the other elements and does not interfere with the viewing thereof. These elements 26*a*, 26*b*, 26*c*, and 58, along with the ticket component 14, provide visually perceptible indicia for the disc ticket 10. While these visual components may be standardized, other more artistic arrangements will occur to those of ordinary skill in the art and fall within the scope of this invention.

With continued reference to FIG. 1, further provided on the first side 12 of the optical disc ticket 10 is the authentication component 27. Such component includes a bar code 27*a* and a hologram 27*b*. The bar code is adhered onto, imprinted onto, or burned into the indicia receiving surface 13 and includes information duplicating the ticket component 14 information (36, 38, 40, 42, 44, 46, 48, and 50 in FIG. 9). Such bar code may be scanned and decoded by a conventional bar code reader 64 at a point of entry 17 (FIG. 4). Other suitable authentication data may be included in the bar code 27*a* as well. It will be appreciated that the bar code could be substituted for the ticket component 14 to gain access to the event associated with the optical disc ticket 10 but it is preferable to include the visually perceptible ticket component 14 for the convenience of both the user and point of entry attendant. The other member of the authentication component, the hologram 27*b*, is created using any suitable techniques such as those as conventionally used in ticket distribution and credit card industries. The hologram is adhered onto or otherwise set into the indicia receiving surface 13. Such hologram may increase the difficulty of creating counterfeit tickets. Both the bar code 27*a* and hologram 27*b* are positioned so as not to obstruct any of the other components 14, 26, or 29 and may or may not overlie the background element 58.

As further illustrated in FIG. 1, the instruction component 29 included on the indicia receiving surface 13 is also positioned so as not to obstruct the ticket component 14, advertising component 26, or authentication component 27. Such instruction component 29 is in the form of a textual statement or command for directing the user's attention that additional features are encoded on the reverse side 15 of the disc ticket 10. This statement is worded to significantly increase the likelihood that a user will play the disc ticket in a conventional disc drive 21 (FIG. 4) so that the encoded advertising will also be viewed. Examples of typical instructions include "Free downloads on back", "Exclusive performer information on reverse", "Chance to win, play reverse side in computer for details", "For play in conventional disc player", "Further information concerning event encoded on reverse side", "Access free promotional items online", or any other suitable gimmick for enticing the user to access the digitally encoded data 22, 23 such that the machine readable advertising as described in detail below is encountered by the user thereby enhancing the value of the such advertising.

Turning now to FIG. 2 illustrating the reverse side 15 of the optical disc ticket 10, the optical storage region 20 is concentrically arranged around the central aperture 25 and extends radially outwardly to the fine marginal area 24 thus taking up almost all of the second side 15 surface space to maximize the data capacity of the disc ticket 10. In this exemplary embodiment, the optical surface 20 includes a 650–680 MB storage capacity for storing digital data as for a conventional single sided CD-ROM. Within this optical storage region, digital data may be encoded, written, or "burned" into the CD in the form of pits and tracks as would be understood by one of ordinary skill in the art. The plastic of the substrate layer of the optical disc ticket 10 is preferably a polycarbonate material or other optically transparent embossable material as also understood by those skilled in the art.

With continued reference to FIG. 2, the optical disc ticket 10, as purchased by a user, includes digital information encoded in its optical storage region 20 including a main program 66, a database 67, and a communication program 63. In general terms, the main program is an application or script written in a web based programming language such as hypertext markup language (HTML) or other suitable programming language to generate a series of display layouts or pages in a World Wide Web format or other suitable multimedia presentation incorporating the multimedia content stored in the database 67. In this exemplary embodiment, the database is structured to store and maintain the event related data 22 and sponsor related data 23 in a group of associated folders and files. In general terms, the event related data 22 and sponsor related data 23 are preferably provided in a multimedia format including video, audio, text, graphics, applications, downloadable files and other typical multimedia elements which may be used by the main program to generate series of related or linked display pages. The downloadable data elements may be exclusive or non-exclusive and free, subscription based, or on a pay per download fee arrangement. The encoded sponsor data 23 typically includes logos, banners, web page links, downloads, and other advertising data which are capable of being encoded in the optical disc surface.

More specifically, the event related data 22 is subdivided into venue related data 22*a* and performer related data 22*b*. Venue related data is stored in a top level venue folder 601 while performer related data is stored in a top-level performer folder 603. The venue folder is subdivided into a static venue element sub-folder 602 and a dynamic venue element sub-folder 604. Likewise, the performer folder 22*b* is subdivided into a static performer element sub-folder 606 and a dynamic performer element sub-folder 608. The sponsor related data 23 includes a top level sponsor folder 23*a* which is similarly divided into sub-folders, including a static sponsor element sub-folder 610 and dynamic sponsor element sub-folder 612. Static data is preloaded onto the optical storage surface into the database 600 and does not change unless the disc ticket is re-encoded with new data. On the other hand, dynamic data is in the form of a URL or other address indicating the location of the data element online and requires a communication program and online access. Using dynamic data, a venue, performer, or sponsor may update their data elements online allowing the user to use the disc ticket to obtain continuously or periodically updated data elements associated with either the venue, performer, or sponsor. One particular example is a hyperlink to a seating chart which may change as the performer changes. Another example may be audio tracks or short movie clips previewing upcoming attractions for the venue.

Still referring to FIG. 2, each of the sub-folders 602, 604, 606, 608, 610, and 612 includes a set of commonly named data type folders which hold the files or data elements which are used in the display pages generated by the main program 66 as will be described below. In this exemplary database structure, each sub-folder includes folders named audio data files 614, animation data files 616, text data files 618, graphics data files 620, video data files 622, multimedia data files 624, and downloadable data files 626. The download data file 626 is further segregated into three additional data fields including a free download file set 628, a pay per download file set 630, and a subscription file set 632.

Commonly used data elements incorporated into digital display and audio environments may be stored in each data file. For instance, examples of data elements that may be stored in the audio data file 614 include song clips, sound bytes, and music tracks. The animation data file 616 may commonly include animated icons, cursors, or other animated graphical or textual elements. The text data file 618 may include written descriptions of the venue, headings, captions or the like. The graphics data file 620 may include the background 58, wallpaper, static icons, logos and other suitable graphical representations. The video data file 622 may include movie shorts, interview clips, previews, and the like. The multimedia data file 624 generally includes various items combining two or more of the previous field categories such as full length audio-visual movies or slide shows and the like. Such examples are not meant to be limiting in any manner and other suitable data elements will occur to one of ordinary skill in the art.

Within the download data file set 626, the free download file set 628 includes files that the user may download off the optical disc if from a static element sub-folder 602, 606, or 610 or online from a content server 118 (FIG. 4) if from a dynamic element sub-folder 604, 608, or 612 without paying any additional costs once the disc has been purchased. Similarly, the pay per download file set 630 includes files which may be downloaded directly from the optical disc or from the online content server 118 but on a pay per download basis using a credit card or other established means of exchange. Thus, a user would have to pay each time he or she accesses a file from this data set. Another option is the subscription download file set 632 wherein a user pays a subscription fee on a periodic basis in advance and is provided a password to access selected downloads from this file set. Exclusive venue promotions and performer promotions or advance notice of upcoming events may be provided in the subscription files. While each of the sub-folders 602–612 is illustrated leading to the commonly named data folders 614–632, this is merely for ease of illustration and it should be noted that each sub-folder will include unique data sets corresponding to its respective venue related information and promotions, performer related information and promotions, or sponsor related information and promotions.

The communication program 63 also encoded on the optical disc ticket 10 is accessible by the main program 66 to enable a user to access online data directed by the dynamic data files 604, 608, and 612 using the disc ticket system 100 (FIG. 4) as will be described below.

Turning now to FIGS. 2, 3, 3a, and 3b, the main presentation program 66 encoded into the disc ticket 10 is programmed to access the event and sponsor data elements 22, 23 respectively, through the folders 601, 603, 605, sub-folders 602, 604, 606, 608, 610, and 612, and file sets 614–632 loaded into the database 600 to generate display pages such as those illustrated in FIGS. 3, 3a, 3b, 10, 10a, 10b, 10c, and 11 on the display device 104 and audio signals over the speakers 106 of the disc ticket system 100 (FIG. 4). For instance, in this exemplary embodiment, upon initiation by the user as will be explained below, the main presentation program 66 generates a start menu page 72 (FIG. 3) having a start menu header 71 at the top of the display, a selectable navigational tool bar icon 78, a venue description as graphically illustrated by a number of vertically stacked lines 73, a series of photo images of the performers, illustrated as open blocks and designated 75, and a designated sponsor advertising space 77 incorporating an ad element such as an animated banner graphically represented by the elongated rectangle near the bottom of the display page 72. As the start menu 72 is the first display page the user will encounter, this advertising space 77 may command a premium price. A selectable communication icon 79 is also provided in the lower right hand corner of the start menu 72 for activating the communication program 63 (FIG. 2) to access online data provided on the system 100 (FIG. 4). Alternatively, a brief video or other introductory display or audio segment may be played prior to actual display of the start menu 72. Such display elements 73, 75, and 77 are stored in the database 600 under the corresponding folder and file. For instance, the data file representing the text description 73 of the venue would be stored in the text data file 618 of the static venue elements sub-folder 602 of the top-level venue folder 601. The data file representing the performer photographs 75 would be stored in the graphics file 620 of the static performer elements sub-folder 606 in the top-level performer folder 603. The premium advertising space 77 would incorporate a data file corresponding to the animated banner from the animation data file 616 in the static sponsor element sub-folder 610 in the top-level sponsor folder 605. The other elements including start menu header 71 and nav tool bar icon 78 are standard features built either directly into the main program 66 or stored in an alternative section in the database 600 where they may be accessed by the main program when generating the display 72.

Selection of the nav tool bar icon 78 using conventional computer navigation techniques transmits a request to the main program 66 to display the tool bar pop up window 78 which expands to cover a larger portion of the main menu page 72. The nav tool bar window 78 includes a nav tool bar header 81, a performer information link 80, a venue information link 82, and a sponsor information link 84. Each of these links 80, 82, and 84 are selectable to transmit a command to the main program 66 to generate an associated display. As this nav window 78 is typically displayed every time the user accesses the disc and navigates throughout the displays, additional premium advertising space, generally designated 86, is positioned within the pop up window as well. Within the premium advertising spaces 77 and 86 may be placed banners, web site addresses, logos and other suitable ad elements of paid sponsors stored in the top-level sponsor folder 605 under the matching data file set 614–632. A similar icon representing the navigational tool bar 78 is preferably loaded onto each display page allowing the user to jump back and forth between display pages quickly.

Figure 3:
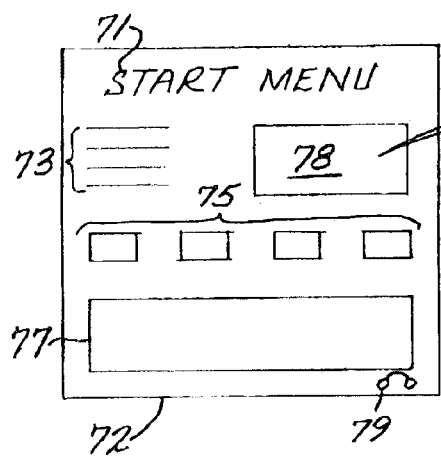
FIG. 3 is an exemplary main menu display of the decoded multimedia contents of the optical disc ticket illustrated in FIG. 1.
Figure 3A:
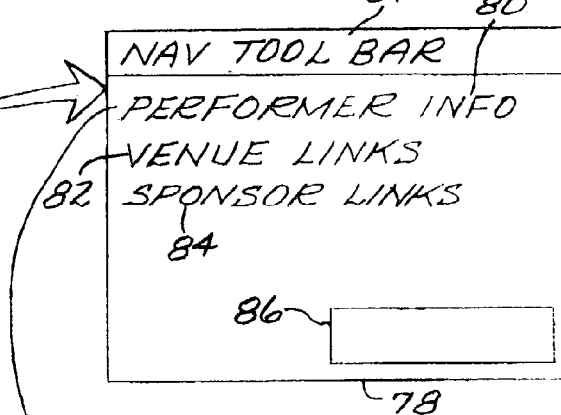
FIG. 3a is an exemplary pop up display, in expanded scale, of a navigational tool bar incorporated into the main menu display in FIG. 3.
Figure 3B:
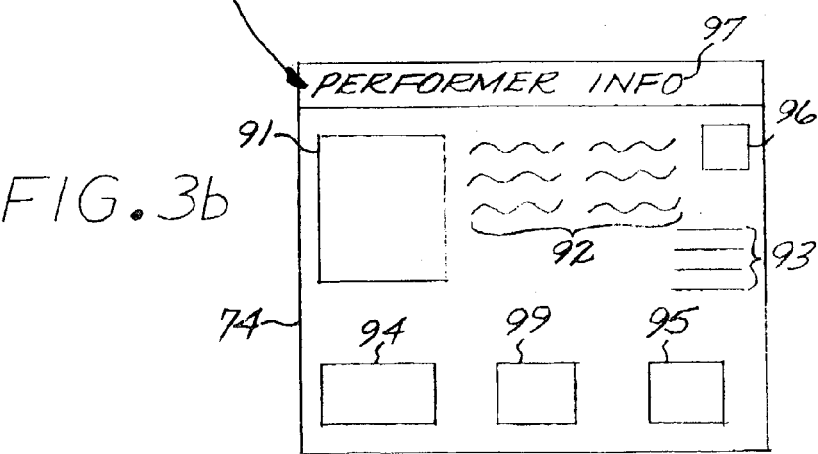

Referring to FIGS. 3a and 3b, each of the links 80, 82, and 84 is a preferably a hypertext link that, upon selection, pulls up the appropriate display page. For example, selection of the performer information link 80 in FIG. 3a transmits a command signal to the main presentation program 66 to generate the performer information page 74 (FIG. 3b). An exemplary layout of the performer link page 74, as illustrated in FIG. 3b, includes a performer information header 97 arranged above a performer info section graphically represented by rectangle 91, a performer biography section graphically represented by wavy lines 92, links to performer audio tracks 93, an iconic link to performer videos 94, an icon representing a performer pictures section 99, a free downloads icon 95, and an advertising element 96 such as a corporate logo. Such layout is merely for illustrative purposes and is not meant to be limiting in any manner.

With reference to FIGS. 2 and 3b, the display elements on the performer information page 74 are generated by the main program 66 which accesses the data elements 91–96 and 99 from the associated data file sets 614–632 in the database 600. For example, after receiving a command to display the performer page 74, upon selection of the performer information link 80 in the nav tool bar 78 by the user, the main program accesses the data file sets 614–632 corresponding with the particular display element. For example, the performer information section 91 and performer biographical section 92 may be maintained in the text data set 618 in the static performer element sub-folder 606 in the top-level performer folder 603. The links to the performer audio tracks 93 and the associated audio tracks themselves are stored in the audio data set 614 in the static performer element sub-folder 606 in performer folder 603. Also stored in the performer folder 603 and sub-folder named static performer elements 606 are the iconic link to performer videos 94 and associated videos in the video data set 622 and the iconic representations of performer pictures 99 and associated photo images in the graphics data set 620. More specifically, the iconic link to performer videos 94 includes path information for locating the associated video in the video data set 622 so that when selected by the user, the video will accessed and played for the user. Other iconic links and similar links operate in a similar manner. The free downloads icon 95 and associated downloadable files such as previews of upcoming music clips by the performers are stored in the free download data sub-set 628 of the download data set 626. Download data files and data elements, whether free, pay per, or subscription, are considered file and data types which may be copied from the optical disc ticket or online content server 118 (FIG. 4) to the user's system.

The sponsor element 96, exemplified as a logo, is stored under the graphic data set 620 in the static sponsor elements sub-folder 610 of the top level sponsor folder 605. Thus, it will be appreciated that the main program 66 may access elements from any one of the folders, venue 601, performer 603, or sponsor 605 for display on any display page. Such feature facilitates placement of sponsor related advertising among data elements relating to the event, i.e. performer and venue data elements.

Referring now to FIG. 10, an exemplary venue information layout 160 is illustrated. This venue information layout is generated by the main program 66 (FIG. 2) if the venue info link 82 (FIG. 3a) on the nav tool bar 78 is selected by the user. Such layout includes a venue information header 161 located near the top of the layout and above a primary elongated sponsor advertising space 162, an iconic link to a seating chart 164, an interactive map iconic link 166, a thumbnail venue photograph 168, a text section for upcoming venue events 170, and a second advertising space including an animated logo, graphically illustrated by abstract shape 172. A preselected sponsor advertising element to appear in the primary sponsor advertising space 162 is stored in the sponsor folder 605 in the particular data set 614–632 associated with the type of file that is displayed. The iconic link 164 and associated seating chart may be stored in the graphics data set 620 of the static venue elements sub-folder 602 of top-level venue folder 601. The iconic link 166 and associated interactive map may be stored in multimedia data set 624 of the same folder and sub-folder as iconic link 164. Thumbnail venue photograph 168 is similarly stored in the graphics data file 620 while the information concerning upcoming venue events is stored in the text data file 618, both under the static venue elements sub-folder 602 of the top level venue folder 601. The animated sponsor ad element 172 is stored in the animation data file 616 of the static sponsor elements sub-folder 610 of the sponsor folder 605.

Referring now to FIG. 11, an exemplary sponsor page layout 180 accessible by selecting the sponsor information link 84 on the nav tool bar 78 (FIG. 3b) is illustrated. The sponsor page layout includes a sponsor information page header 181 and is typically used for displaying hyperlinks 182 to each of the sponsors contributing to the funding of the event. In addition to the hyperlinks 182, corporate sponsor information is typically provided in a combination of text blocks and thumbnail images of corporate logos for each of the 1-n sponsors contributing to the event as graphically represented by group reference numeral 184. The thumbnail image may be selected to provide the corporate contact information. Such sponsor layout is primarily provided as a low cost advertising alternative to the premium ad spaces 77 on the pages most visited such as the main menu page 72. As the links for each sponsor 182 provide locations to online sponsor information, such links may be stored in the multimedia data file 624 of the dynamic sponsor elements sub-folder 612 of the top level sponsor file 605. The text blocks and thumbnail images 184 are stored in the respective text data file 618 and graphics data file 620 of the static sponsor elements sub-folder 610 of the sponsor 605.

The disc ticket system

With reference now to FIG. 4, the versatility of the optical disc ticket 10 will be appreciated when taken in consideration with the features of the optical disc ticket system 100. Such system 100 includes three primary sub-system components, a ticket distribution sub-system 101, an event access sub-system 103, and a content access sub-system 105, all of which may interact with the optical disc ticket 10.

Purchasing Sub-system

With continued reference to FIG. 4, the purchasing sub-system 101 provides a location for exchanging currency 107 or credit for the disc ticket 10. The purchasing subsystem is a point of sale such as a ticket window at a box office 109, online ticket broker, or other ticket vendor and capable of distributing optical disc tickets in exchange for currency 107 in real time if necessary. Purchased optical disc tickets may be mailed, picked up, or held until event show time as is customary in ticket purchasing transactions. If the optical disc ticket 10 is to be distributed at the point of sale, then the ticket component 14 is imprinted on the optical disc ticket at the point of sale using conventional methods. If the optical disc ticket 10 is to be delivered via mail or other similar means, then the ticket component may be printed elsewhere and the ticket delivered per the selected means such as mail or left at will call. In this particular embodiment, the ticket component 14 may also be printed out in the form of an adhesive sticker and adhered to the indicia receiving surface 13 of the disc ticket. Alternatively, the ticket information as illustrated in FIG. 9 may be printed directly onto the indicia receiving surface. A bar code scanner 108 is provided at the distribution center 109 so that the bar code 27a may be scanned and the readings transmitted to an authentication database 112 to store ticket component 14 information (FIG. 9) and associated authentication data such as a code or other suitable authentication information.

Entry Sub-system

The event access sub-system 103 includes a point of entry 17 such as a turnstile or gate monitored by a ticket taker and at which is provided a bar code reader 64. At the point of entry the ticket component 14 of the optical disc ticket 10 may be requested by the ticket taker prior to gaining access to the event. The bar code reader 64 is connected to a verification processor 121 in communication with the database 112 of the distribution sub-system 101 to look up authentic bar code information to determine the authenticity of the optical disc ticket 10 at the point of entry 17. In addition, the ticket component 14 and hologram 27b may be visually scanned by the ticket taking attendant at the point of entry. Conveniently, once inside the point of entry, the user may refer to the seating information 44, 46, and 48 (FIG. 9) on the optical disc ticket to locate the appropriate seat increasing the likelihood of the user encountering the visual ad component 26 and instruction component 29. Thus, while some measure of advertising may be initially encountered by the user on the indicia receiving surface 13, the instruction component 29 encourages the user to access the digital event and sponsor elements, 22, 23 respectively, stored in the optical storage surface 20 of the disc ticket 10 thereby providing an improved probability that the additional advertising and information outlets are encountered by the user.

Advertising Access Sub-system

With reference to FIGS. 1 and 4, the contents access sub-system 105 enables the user to access the event and sponsor information 22 and 23, respectively encoded in the machine readable region 20 on a purchased optical disc ticket 10. As the digital contents of the optical disc ticket 10 are broken into static or standalone data as stored in sub-folders 602, 606, and 610 and dynamic data elements or online data as stored in sub-folders 604, 608, and 612, two facets of the contents access sub-system 105 are provided.

In this exemplary embodiment, the primary device is a personal desktop computer, generally designated 115, with a processing device 102 electronically coupled to a conventional optical disc drive 21 which transmits decoded digital contents from the optical storage surface 20 to the processor 102. A display device 104 in communication with the processing unit 102 displays the page layouts 72, 74, 78, 160 and 180 (FIGS. 3, 3a, 3b, and 10–11) as directed by the main program 66 on the disc ticket 10. Speakers 106 are in communication with the processing unit 102 which includes a sound card enabling the audio components from the data sets 614–632 to be audibly output. A standard input device 113 such as a keyboard or mouse is also in communication with the processing unit 102 for receiving user input.

In this exemplary embodiment the event and sponsor digital data 22 and 23, respectively, main program 66, database 600, and communication program 63 in the optical storage region 20 of the optical disc ticket 10 may be decoded by the laser of the conventional optical disc reader 21. The main program 66 determines how the data elements in file sets 614–632 are displayed on the display device 104 and initially generates the main menu 72 (FIG. 3) on the display device 104 when the optical disc ticket 10 is placed in the disk drive 21 with or without a lead-in display or video as determined by the main program 66. The main program is responsive to input from the input device 113 to determine how the main menu exchanges with other display pages such as those illustrated in FIG. 3b, 10 or 11.

If the data is standalone and static, meaning the optical disc ticket 10 is self-contained with data elements 22 and 23 that do not change, then no online access is required, and there is no additional need to connect via a communication device to an online service to display the encoded data. However, to take advantage of the dynamic venue, performer, and sponsor elements stored in sub-folders 604, 608, and 612, respectfully, additional equipment is necessary. As the dynamic data elements as stored in sub-folders 604, 608, and 612 are links to data stored online which may be changed or updated in files located on a network, a communication device 108 such as a conventional modem is connected to the processing unit 102 and is activated by depressing the communication icon 79 on the start menu page 72 (FIG. 3). The modem is connected to a public switched telephone network (PTSN) 114 which is in turn connected to the Internet 117 through a gateway 116. The communication software program 63 governs the communication process between the online network 117, the modem 108, and the processing unit 102 in a conventional manner.

Further connected to the Internet 117 is a content server 118 which maintains dynamic venue data 120, dynamic performer data 122, and dynamic sponsor data 124. This data 120–124 is generally provided by the associated representatives of the venue, performer, and sponsors and is used to provide new data about upcoming events, music releases, sponsor videos and other information and promotional material to be provided to the user. Thus, it will be appreciated that the dynamic data elements, stored in the sub-folders 604, 608, and 612 in the form of links or addresses to information online, may be fixed but the online data stored in the content server 118 that the dynamic links point to are changeable on a periodic or continuous basis thereby enhancing the optical disc ticket 10 as a continuous or frequently encountered advertising avenue.

Exemplary Process for Creating and Distributing an Optical Disc Ticket

Figure 8:
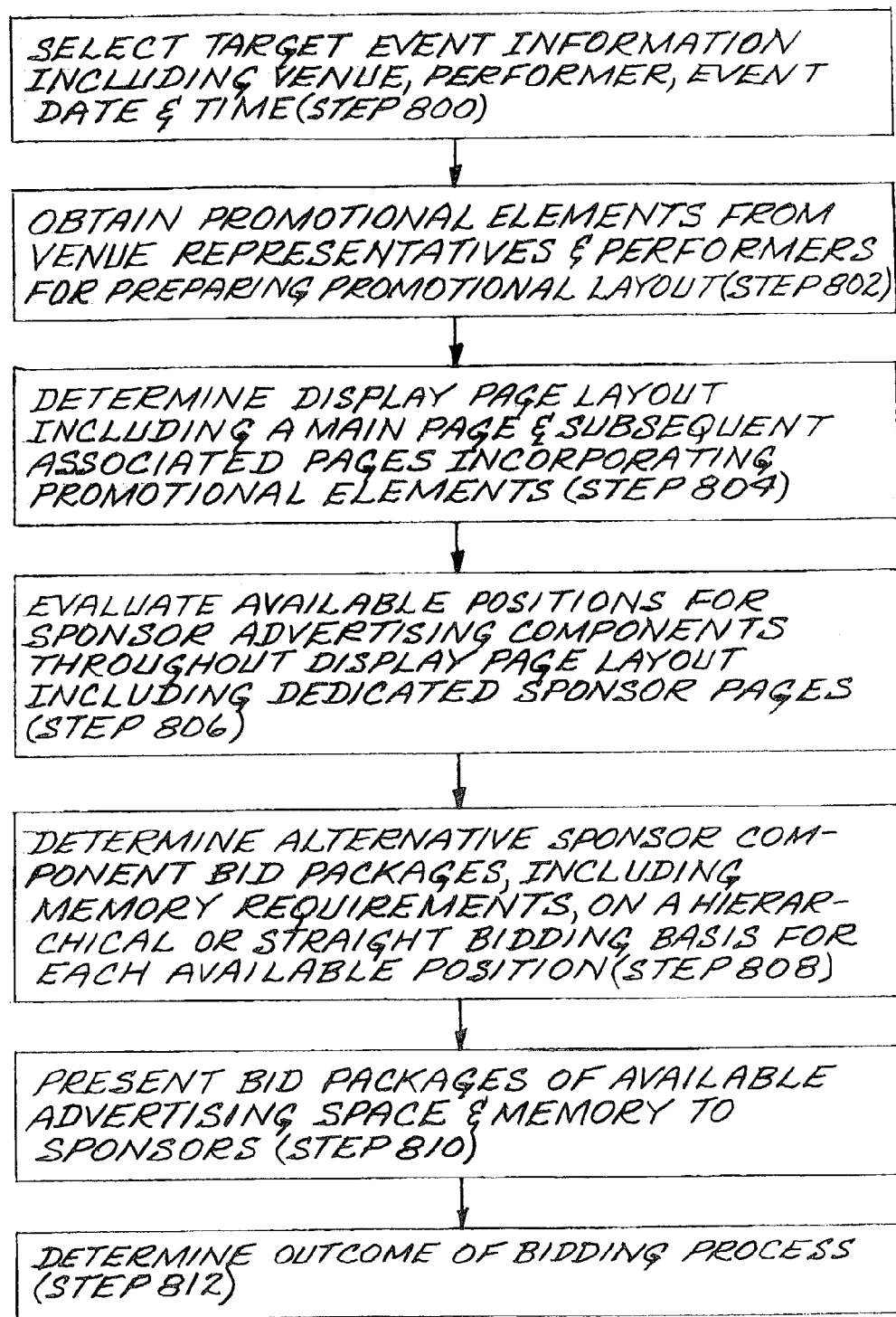
FIGS. 8, 8a, and 8b are continuous process diagrams for creating and distributing the optical disc ticket of the present invention.
Figure 8A:
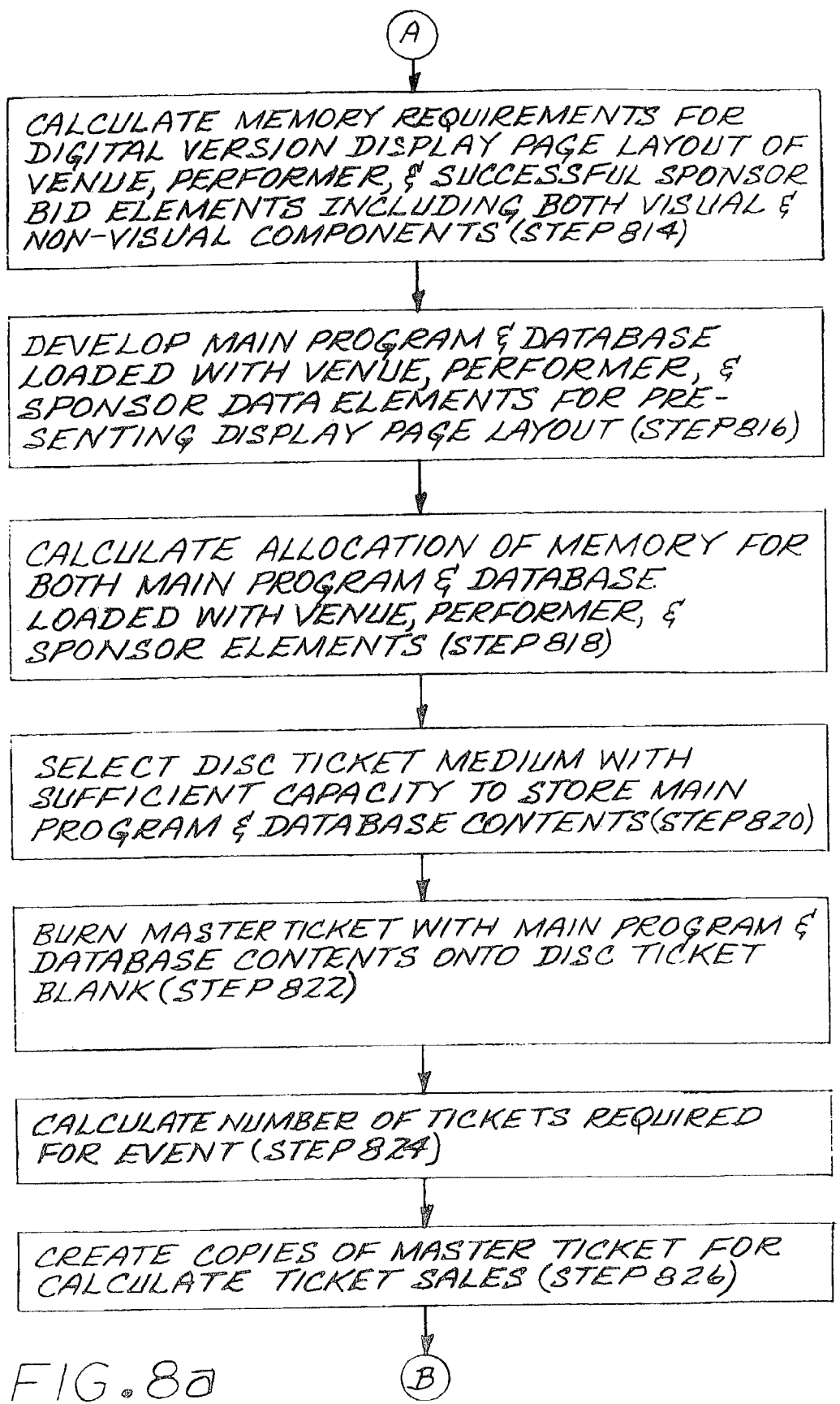
Figure 8B:
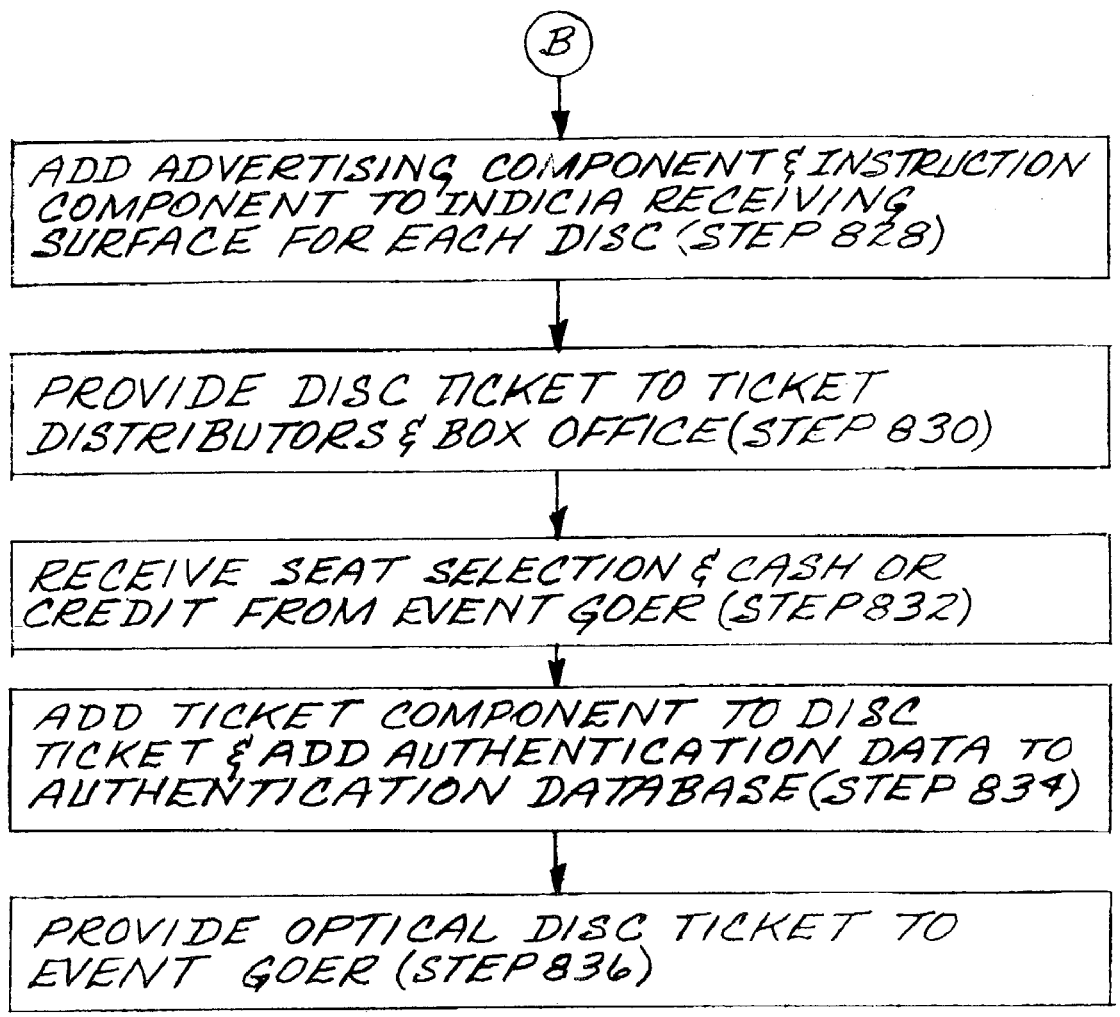

Referring now to FIGS. 8, 8a, and 8b, a process for creating and distributing the optical disc tickets will now be described. Preliminarily, as described in step 800, a promoter or event coordinator selects a target event and gathers information relating to the event including venue information, performer information and event date and time. Contractual arrangements are then entered into securing the performer and venue for the selected event. For example, a rock band playing a major metropolitan arena may be targeted and secured. After securing the performer and venue, all promotional elements such as performer logos, photographs, videos, music clips, write-ups as well as venue seating charts and venue location information are collected from the performer and venue representatives for placement consideration on the optical disc ticket 10 (step 802). The actual layout of the indicia receiving surface 13 (FIG. 1) and presentation pages 72, 74, 78, and 160 (FIGS. 3, 3a, 3b, 10, respectively), without sponsor elements is determined using story boards or other advertising and promotional techniques incorporating at least some of the collected promotional elements (step 804).

Available spacing for sponsor advertising is then evaluated (step 806). For example, referring to FIG. 10, the space just below the venue info header 161 of the venue information page 160 provides a primary sponsor ad space 162. Based on the available sponsor space 162, the promoter develops alternative sponsor component bid packages (step 808). In general, placement of desired sponsor information is determined by a hierarchical bidding process with the highest bidders obtaining preferred placement for their sponsor related advertising. For example, the highest bidder obtains a position for its advertising on the start menu 72 and may further purchase advertising on any content page that is viewed. At the other end of the spectrum, a lower bidder may only be able to place their advertising on a page that must be selected by a user and could be bypassed altogether. Other advertising placement strategies will occur to one of ordinary skill in the art.

As a further example, as illustrated in FIGS. 10a–10c, such sponsor ad space could incorporate a large animated banner 900 (FIG. 10a) dedicated to a single sponsor which would cost higher than the individual costs of three individual sponsor animated icons 902a, 902b, and 902c (FIG. 10b) appearing in the same ad space 162 as represented by the two dollar signs. The banner and animated icons would also cost significantly higher than the costs of a number of individual sponsor addresses 904a, 904b, 904c, 904d, and 904e, as represented by the single dollar sign, all appearing in the same space 162. Depending on the amount of sponsor generated revenue for ad elements to be placed in the main menu 72 (FIG. 3), performer page 74 (FIG. 3b) and venue page 160 (FIG. 10), additional dedicated sponsor pages 180 (FIG. 11) may also be considered using a similar hierarchical bidding scheme. Alternatively, blocks of ad space and memory may be sold on a first come, first serve basis according to a unit of memory. For example, 5 MB blocks of memory may be offered for sale along with a dedicated sponsor page.

With continued reference to FIG. 8, these alternative bid packages as illustrated in FIGS. 10a–10c and FIG. 11 are presented to available sponsors by the promoter (step 810) and the outcome of the bidding process wherein the highest bidder obtains the premium ad spaces 77 (FIG. 3) and 86 (FIG. 3a) or larger more complex ads taking up more memory or based on a first come, first serve basis is determined (step 812). Continuing with FIG. 8a, the memory requirements for a digital version of the display page layout of the venue, performer, and successfully bid sponsor elements including any dedicated sponsor pages along with any audio memory requirements are calculated (step 814). The main program 66 for generating the page layouts is developed along with the database 600 loaded with the digital event data elements 22 and sponsor data elements 23 (step 816). Allocation of memory for the main program and loaded database is calculated to determine an overall storage capacity requirement (step 818). A disc ticket medium is selected with sufficient capacity to digitally encode and store the main program 66, including communication program 63 and loaded database 600 (step 820). For example, the main program requires 110 MB of memory, the communication program requires 10 MB of memory while the loaded database requires 490 MB of memory for a total of 610 MB of memory. The promoter would typically select a single-sided CD-ROM with optical storage capacity of 650–680 MB to satisfy this memory requirement.

Continuing with FIG. 8a, the optical disc tickets 10 (FIG. 1) are then created. Initially the optical disc tickets are prepared using conventional optical disc technology to form ticket blanks having a main disc body 11 upon which is placed the indicia receiving surface 13 on one side 12 and a blank unencoded optical storage region 20 on the opposing side 15 (FIGS. 1–2). A master ticket is then burned using conventional CD writing methods to encode the main program 66, loaded database 600, and communication program 63 onto the optical disc ticket 10 (step 822). The actual or estimated number of tickets for the targeted event is calculated (step 824) and copies of the master disc ticket are generated using conventional disc copying techniques (step 826).

Continuing with step 828 in FIG. 8b, for each ticket a predetermined visual format including background 58, advertising elements 26a, 26b, and 26c, unique authentication component 27a, 27b, and instruction component 29 are imprinted or otherwise adhered onto the indicia receiving surface 13 leaving a space for the ticket component 14 (FIG. 1). Placement of the background 58 (FIG. 1) and advertising component 26 (FIG. 1) may be determined using a similar bidding process as for the digital data elements. The disc tickets 10 are provided to ticket distributors 109 (FIG. 4) in step 830. An available seating selection is determined between the ticket distributor and event goer and cash or credit is provided (step 832).

Referring to FIGS. 1, 4, and 8b, the ticket distributor 109 adds the ticket component 14 (FIG. 9) to the disc ticket 10 and adds the authentication data 27a to the authentication database 112 using the barcode scanner 108 in step 834. In exchange for currency 107 or credit, the event goer is furnished with a unique optical disc ticket 10 reserving a designated seat corresponding to the ticket component 14 for each ticket purchased. The ticket distributor provides the authenticated and purchased optical disc ticket 10 to the user (step 836) or the tickets are held at will call or mailed if purchased remotely.

Usage of the disc ticket after purchase

Referring now to FIGS. 1 and 4, upon receipt of the optical disc ticket 10 from the ticket distributor 109, in checking over the ticket component 14 information for accuracy, as commonly requested at ticket offices, the event goer will likely be drawn to examine the advertising component 26, authentication component 27, and instruction component 29. This, it is likely that the event goer will encounter both the visual sponsor advertising element 26a and instruction component 29 enticing the user to access the digital contents stored on the other side of the disc ticket 10 in the optical storage region 20 increasing the likelihood of encountering additional advertising. The use of the compact disc as a medium also increases the likelihood that the event goer will attempt to access the digital contents stored on the disc even without such instruction component 29.

With continued reference to FIGS. 1 and 4, to get into the event, the event goer presents the disc ticket 10 to an attendant at the point of entry 17 on the day of the event as indicated on the ticket component 14. The attendant will initially review the visual ticket component 14 and look for the presence of the hologram 27b as a preliminary check on the authenticity of the disc ticket 10. The attendant then runs the bar code 27a over the scanner 64 which decodes the bar code and transmits the decoded signal to the verification processor 121. The verification processor accesses the authentication database 112 and compares stored unique disc ticket authentication records, originally created by the ticket distributor 109 at the point of sale, with the scanned bar code 27a on the disc ticket 10 and pre-stored in the authentication database 112. Assuming confirmation of authenticity such as by finding a match in the authentication database 112, the verification processor 121 transmits a signal to the bar code reader 64 to indicate acceptance such as by lighting a green light or sounding a beep. The attendant will then allow the optical disc ticket holder into the event. The event goer may then refer to the visual ticket component 14 (FIG. 9) to locate the purchased seat.

Accessing the digital contents of the optical disc ticket

While in most cases, a paper ticket would merely be set aside in a convenient and safe location until the day of the event or thrown or stored away after the event, the optical disc ticket 10 (FIG. 1) described herein includes features rendering it useful both prior to and after the event. More specifically, while the optical disc ticket 10 provides a convenient means for gaining access to an event, it also provides numerous advertising avenues and is constructed to increase the likelihood that such advertising reaches the event goer. For instance, referring to FIG. 1, upon receiving the optical disc ticket 10, the event goer refers to the ticket component 14 on the printed side of the optical disc ticket to verify the information is correct as is commonly directed by the ticket distributor 109 (FIG. 4). As the ticket component 14 is positioned in close proximity with the visual advertising component 26, including the sponsor ad element 26a, the likelihood increases that the event goer or patron also views such sponsor ad element exposing the ticket holder to a first ad element positioned in a highly visible location. It is further likely the other visual components 26b, 26c, 27, and 29 on the indicia receiving surface 13 as well will be viewed by the user when viewing the ticket component. As it is also likely the ticket component 14 will be referred to again at event time to view the seating arrangement 42 (FIG. 9), a second advertising encounter by the user is also highly likely reinforcing the first ad encounter.

With continued reference to FIGS. 1 and 4, in viewing the ticket component 14, it is likely the ticket holder will view the instruction component 29 directing placement of the optical disc ticket 10 into an optical disc reader 21 or otherwise enticing the event goer to play the optical disc ticket in a disc reader thereby further increasing the likelihood that the event goer will encounter the digital advertising elements 22, 23 at least once when the disc is played in a disc reader 21. Following the direction provided in the instruction component 29, the event goer places the optical disc ticket 21 on the loading tray of a conventional optical disc drive 21 with the central aperture 25 aligned with the drive spindle to turn the disc ticket. As the disc spins with the optical storage surface 20 facing the laser of the optical disc drive 21, the disc drive reads the pits and tracks encoded in the optical storage region 20 and sends decoded signals relating to the contents of the optical disc ticket 10 including the main program 66, database 600 with loaded event elements 22 and sponsor elements 23, and communication program 63 to the processing unit 102 in communication with the disk reader. It will be appreciated that even without the instruction component 29, due to the widespread use of compact discs today, it is likely that a ticket holder will attempt to play the optical disc ticket 10 in a conventional disc player 21. The instruction merely improves the chances that the content stored in the optical surface is viewed.

Referring now to FIGS. 1–4, after receiving the digital data from the optical disc ticket 10 as provided by the optical disc drive 21, the processing unit 102 initially launches the main program 66 which is preferably self-executing. The main program 66 accesses the database 600 and searches the folders 601, 603, and 605 and their respective sub-folders 602, 604, 606, 608, 610, and 612 and their respective data file sets 614–632 to retrieve the display elements 71, 73, 75, 77, 78, and 79 as determined by the main program 66 to generate the main menu 72 on the display device 104 and/or audio playback over speakers 106.

At this point the ticket holder views the main menu 72 on the display device 104 including both the event elements 22, which are exemplified in this embodiment as a venue description 73 and performer photos 75 as stored in the respective static element sub-folders 602 and 606 in the database 600. The ticket holder will also view another sponsor ad in the premium ad space 77 providing yet another advertising encounter. As the main program 66 is programmed to display the main menu 72 each time the disc ticket 10 is initially read by the optical disc drive 21, the premium advertising 77 will not be bypassed.

Conveniently, the nav tool bar icon 78 is selectable from the main menu 72. By selecting the nav tool bar icon 78 using conventional browsing techniques and the input device 113, the nav tool bar icon expands into an enlarged pop up nav tool bar window 78 (FIG. 3a) displaying the performer info link 80, venue information link 82, and sponsor information link 84, as well as another premium ad space 86 incorporating a sponsor data element from the sponsor folder 605. The user may select any of these links to access additional display pages and the elements provided thereon.

For example, upon selection of the performer information link 80, the main program 66 searches the database for the data elements 22, 23 used to generate the performer information page 74 (FIG. 3b). More specifically, the main program 66 searches the folders 601, 603, and 605 for the data elements 91–96 and 99 and assembles the performer information page 74 on the display device 104. On the performer display page 74, the data elements stored in the database 600 and selected for the preprogrammed display layout such as bios, video clips, audio tracks, downloadable files, pictures are displayed along with any sponsor or other advertiser elements such as logos, banners, and web addresses. Any audio data files may be audibly played over the speakers 106. Again the ticket holder will encounter another ad element 96 is reviewing the displayed contents of this page 74. The pages are typically constructed for an amount of interactivity. For example, the user may select the iconic link to performer videos 94 using the input device 113. Upon receiving the command from the input device 113 through the processor 102, the main program 66 accesses the video data file corresponding with the icon 94 in the video data set 622 of the static performer elements sub-folder 606 in the performer folder 603 and play the video on the display device 104 with accompanying audio on the speakers 106.

Referring now to FIGS. 3a and 10, a selection of the venue link 82 activates the main program 66 to gather the display and audio elements 161, 162, 164, 166, 168, 170, and 172 from the associated folders 601, 603, and 605 in the database 600 to generate the venue information display page 160 providing venue related information such as addresses, parking, seating charts, in addition to the advertising element 162 and 172 allocated to the venue information page 160. Depending on the successful bidder, the venue information page 160 may be generated with the banner of FIG. 10a, the animated icons of FIG. 10b, or the sponsor addresses of FIG. 10c in the ad space 162. Such ad elements are meant to provide examples of possible advertising and are not meant to be limiting in any manner. The other display elements 164, 166, 168, and 170 may be interactive and if selected by the user with the input device 113, the main program 66 accesses the corresponding folder, sub-folder, and data file set to retrieve the requested data element which is then displayed on the display device 104 and/or played over the speakers 106.

Referring now to FIGS. 3a and 11, the user may also select the sponsor link 84 on the nav tool bar 78 to pull up a menu 180 of all sponsors associated with the project along with contact information or web addresses if desired. In generating the sponsor page 180, the main program 66 accesses the sponsor folder 605 and the data elements stored in the data file set 614–632 in the static sub-folder 610 in the database 600 and retrieves the elements determined by the main program. Thus, it will be appreciated that the optical disc ticket 10 provides numerous instances whereby a user will encounter advertising by selective positioning of advertising elements 23 amongst data frequently sought by a user relating to an event such as the performer or venue information, 22*a*, 22*b*, respectively. It will also be appreciated that while each page 72, 74, 160, and 180 have a primary focus, venue related elements 22*a*, performer related elements 22*b*, and sponsor related elements 23 may be placed on any page layout.

Dynamic Online Content

Referring to FIGS. 1–4, while an obvious and enticing the instruction component 29 increases the likelihood of accessing the encoded data 22, 23 on the optical surface 20 of the disc ticket 10 wherein additional advertising features, other than the visual ad elements 26 on the indicia receiving surface 13, are made available to the user along with the frequently sought venue and performer related content 22*a* and 22*b*, respectively, the incorporation of dynamic data elements as stored in sub-folders 604, 608, and 612 provide a level of repeat viewing due to the periodic or continuously updated data elements 22, 23. While such optical disc content 22, 23 may be standalone and static requiring only an optical disc reader 21, processor 102, and display device 104 as provided in subsystem 104 (FIG. 4), it will be appreciated that the optical disc reader system 100 also provides a flexible medium for obtaining dynamically changing content and advertising. Thus, it will be appreciated that access to the digital contents 22, 23 of the optical disc ticket 10 may occur at any time after purchase and the disc ticket continues to be useful even after the event. For example, while the optical disc ticket 10 may be provided with static data elements in sub-folders 602, 606, and 610, and thus provide a standalone ticket use for use in conjunction with a conventional disc reader 21, the incorporation of dynamic data elements in sub-folders 604, 608, and 612, which may be updated over an online network 117 through a content server 118.

Thus selected venue, performer, and sponsor data 22*a*, 22*b*, and 23, respectively may be maintained at a central location or server 118 on an online network 117 such as the Internet and the optical disc ticket 10 encoded with a link or links to this site as stored in the database in the respective dynamic sub-folders 604, 608, and 612. To access this dynamic information, the user may place the disc ticket 10 in the optical disc reader 21 as before launching the main program 66 to display the main menu 72 (FIG. 3). In this embodiment, for example, the venue description 73, performer photos 75, the premium ad space 77 incorporate a web site address. The user will also activate the communication program 63 by selecting the comm icon 79 with the input device 113 to connect to the Internet 117 to access the online content server 118 and activate a preferred browser. Selection of the dynamic links 73, 75, or 77 allows the user to retrieve updated content. For example, selection of the venue description link 73 by the user will activate the main program 66 to retrieve the web site address in the text data set 618 in the dynamic sub-folder 604 of the venue folder 601. Using the communication program 63, the main program accesses the content server 118 and retrieves the data file corresponding to the venue description link 73. For example, information about the venue may have changed since the disc ticket 10 was purchased and an update provided on the content server 118. Upon selection of the venue information link 73, the main program 66 retrieves the updated venue information 120 from the content server 118 and displays the updated venue information 120 on the main menu 72.

In such manner, it will be appreciated that any display or audio feature is potentially updateable through the content server 118 including the download data files 628, 630, and 632 and advertising elements 23. For instance, selection of a pay per download link on the performer page 74 may access the content server 118 to obtain the performer's latest video clips in the updated performer data file 122 (FIG. 4). As new information becomes available and the user revisits the optical disc page layouts, both old and new advertising may be encountered again and again as newly updated venue and performer information 120 and 122, respectively is sought thus enhancing advertising value of the optical disc ticket as an advertising medium.

Thus is unlike the advertising presented at the venue which is removed after the event or other promotional advertising which ceases after the event is completed because the advertising of the present invention is ever present on the disc. In addition, the interactive presentation will appeal to a greater and longer lasting audience desiring to re-live or experience the event. The dynamic Internet content allows both the venue promoter, event promoter, and the sponsors to continuously update their content on their respective web pages.

Accessing Digital Audio Components

In those instances wherein the user does not have access to a personal computer 115 or display device 104, the audio data stored on the optical disc ticket 10 may still be accessible by playing the disc ticket in a conventional disc player 21 such as commonly found in automobile or home stereos. For example, the event goer may place the optical disc ticket 10 in a car CD player or home entertainment center to play any audio tracks contained thereon in the audio data set 614 (FIG. 2) of the sub-folder 602, 606, and 610. Selectively positioned audio advertising will also be played. For instance, audio sponsor information such as commercials or audio web address messages could be played prior to the audio tracks, after the audio tracks, or between the audio tracks. Positioning of the sponsor data 23 is determined as before with preferred positioning determined by any of the bidding systems described herein. As most event goers will start at the beginning of the disc, the higher priced advertising is preferably placed there.

Alternative optical disc ticket embodiments

Other configurations of the optical disc ticket 10 are also contemplated by the present invention. For example, in the embodiment illustrated in FIG. 5, an alternative optical disc ticket 210 includes a substantially circular main disc body 211 with a first side 212 with an indicia receiving surface 213 and a second side with machine readable region similar to that illustrated in FIG. 2. In a similar manner to the first embodiment, the main disc body 211 provides a carrier for the indicia receiving surface 213 and opposing optical storage surface. Connected to the main disc body 211 on opposing sides are a pair of break-off tabs 220, 221 including enlarged handles 224*a*, 224*b*, respectively, with a thin neck region 227*a*, 227*b*, respectively abutting the peripheral edge of the main disc body 211. A thin score line 225, 226 partially separates the respective neck regions 227*a*, 227*b* from the edge of the main body to facilitate breaking the tab off from the disc body.

On the first side 212 of the disc 210 is a plastic sleeve 230 adhered to the indicia receiving surface 213 dimensioned to receive a standard sized or folded paper ticket. The sleeve further includes a side opening 234 for insertion of the ticket component 214 in the form of a paper ticket, appearing as illustrated in FIG. 9, into the sleeve 230 and a transparent window section 236 for viewing of the ticket component 214 therethrough. In other words, the user may view the event title 36, venue location 38, event time and date 40, seating arrangement 42, and ticket price 50 through the window section 236. The remainder of the indicia receiving surface 213 may incorporate the advertising, authentication, and instruction components 26, 27 and 29, respectively, as described herein if desired.

Figure 5:
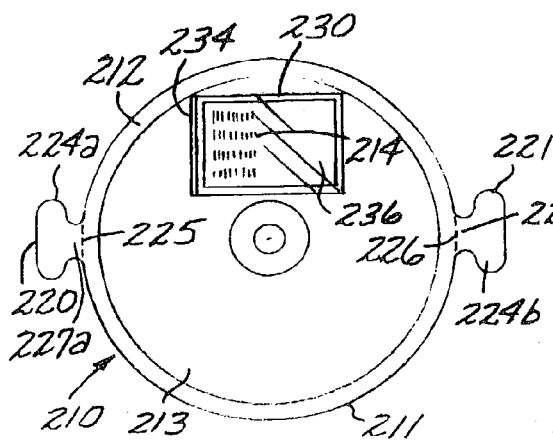
FIG. 5 is a top view of an alternative embodiment of the optical disc ticket of the present invention.

Referring to FIGS. 4–5, in use, the user will receive the optical disc ticket 210 upon purchase at the ticket window 109. A paper ticket will be printed out and slipped inside the sleeve 230 through the side opening 234 so that the ticket component information 214 may be viewed through the window 236. At the proper day and time, the user approaches the point of entry 17 at the event and displays the optical disc ticket 220 to the attendant. The attendant then grasps one of the enlarged handles 224*a* or 224*b* in one hand and the main disc body 211 in the other hand. The tab is then bent until it breaks off from the main body 211 by the respective score line 225 or 226. The disc body 211 then becomes a ticket stub for the user. Once the tab is broken off, this provides a visual indication that the optical disc ticket 210 has been used to gain access to the event. After breaking off a tab, the user is granted access to the event. If no tabs are used, then the paper ticket 214 is removed from the sleeve 230 through the opening 234 and torn per conventional practices with the ticket stub returned to the user to be reinserted back into the sleeve. The optical disc ticket 210 may also be played in a conventional disc drive 21 as described herein once the tabs 224*a*, 224*b* have been broken off from the main disc body 211. It will be appreciated that one or more tabs may used or none at all and that the sleeve and paper ticket features could be incorporated into the first embodiment in place of the ticket component 14.

Figure 6:
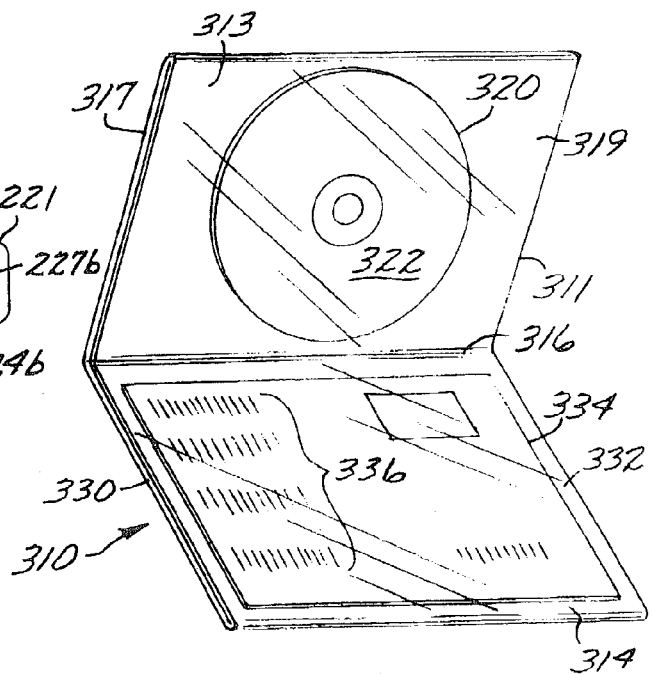
FIG. 6 is a front right perspective view of a third embodiment of the optical disc ticket of the present invention in a partially unfolded configuration.

Referring now to FIG. 6, another embodiment of the optical disc ticket 310 is illustrated in the form of a foldable case 311 having an optical disc receiving pocket 313 and an opposing ticket component receiving pocket 314 separated by a fold line 316. Such disc receiving pocket includes a side opening 317 and a transparent window section 319 and is dimensioned to enclose a conventional sized compact disc 320 with the encoded machine readable surface 322 including the venue, performer, and sponsor data 22*a*, 22*b*, and 23, respectively, as described herein above. The ticket component receiving pocket 314 also includes a side opening 330 and transparent window 332 for placement of a paper ticket 334 bearing a ticket component 336 thereon. Conveniently the case provides a carrier that may be folded along the fold line 316 such that the optical disc 320 and ticket component 336 face one another for storage purposes. It will be appreciated that the back side of both pockets 313, 314 on their respective outer sides could provide an additional indicia receiving surface (not shown) to display additional advertising, authentication, and instructional components.

In use, after selecting the event and purchasing the optical disc ticket 310 at the ticket window 109 (FIG. 4), the ticket seller unfolds the case 310 if necessary and slides the optical disc 320 into the disc receiving pocket 316 through the opening 317 to nest it therein. If the optical disc includes an indicia receiving surface (not shown) it may be positioned within the pocket so that it may be viewed through the transparent window. The ticket 334 is slid through the opening 330 into the ticket receiving pocket 314 such that the ticket component 336 may be viewed through the transparent window 332. The optical disc ticket 310 is then transferred to the purchaser.

At the event site 103, the user unfolds the case and presents the ticket component 336 to the attendant at the point of entry 17. The attendant removes the ticket component 336 from the pocket 314 and tears off a portion and returns the ticket stub to the pocket 314. The user is then authorized to proceed into the event venue. The user may refer to the ticket stub through the window 332 for the seating arrangement.

To view the contents stored in the optical surface 322 of the disc ticket 310, the disc 320 is removed from the pocket 313 and placed in a conventional optical disc reader 21 (FIG. 4). The ticket holder may then navigate the displays of the main menu 72 (FIG. 3) and subsequent display pages as described above.

Figure 7:
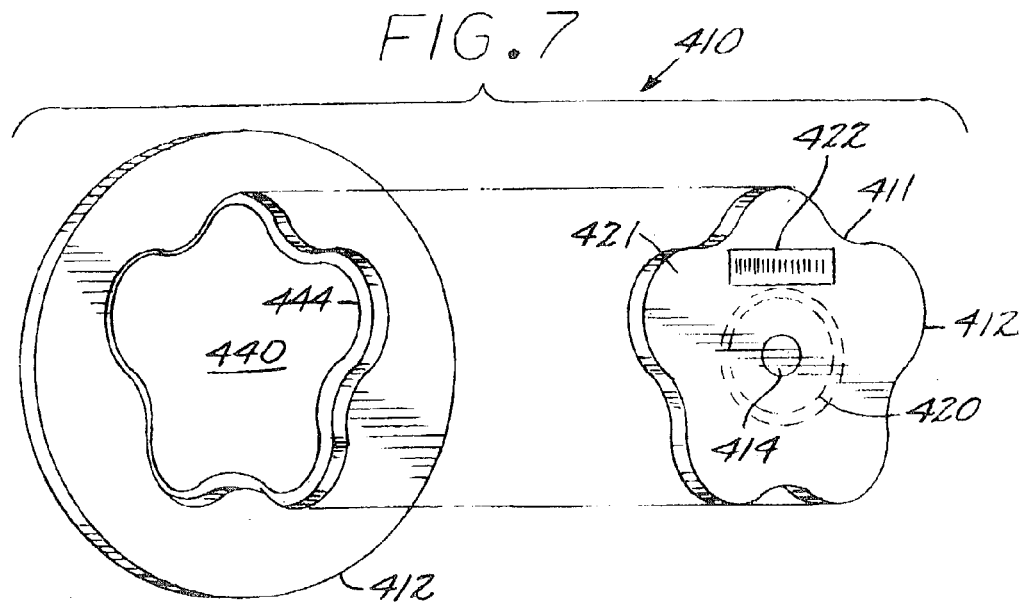
FIG. 7 is an exploded, top right perspective view of a fourth embodiment of the optical disc ticket of the present invention.

Referring now to FIG. 7, another exemplary embodiment of an optical disc ticket 410 is illustrated with a marginal configuration that is not directly compatible with the loading tray of conventional optical disc readers 21. The exemplary disc ticket 410 illustrated in FIG. 7 includes a two sided main body 411, central aperture 414 for receipt of the disc reader spindle, and a non-circular or irregular marginal edge 412 normally incompatible with a conventional disc reader. An indicia receiving surface 421 is positioned on one side of the disc body 411 and a machine readable surface 420, as indicated in phantom lines, placed on the opposing side. Such irregular disc configurations, alone, normally present problems with aligning the optical reading components of the disk drive 21 with the machine readable surface 420 of the disc ticket 410. The indicia receiving surface 421 includes the ticket component 422 in a reduced scale of that illustrated in FIG. 9. The optical storage surface 420 concentrically surrounds the aperture 414 and has a radius of less than the closest portion of the marginal edge 412.

The use of the disc ticket for purchasing the ticket and accessing the event is similar to that described above for the first embodiment. When the user desires to access the contents encoded in the machine readable surface 420, however, a circular insert platter 412 having an interior cutout 440 complementarily formed to the marginal shape of the disc body 411 and exterior margin of a conventional compact disc may be used in order to play the disc in a conventional disc reader 21. At the lowermost edge of the recess is a thin retention lip 444 for the optical disc body 411 to reside thereon. Both the disc body 411 and platter 412 fit together like a puzzle with the disc ticket body 411 inserted into the recess of the platter to nest therein. A friction fit is sufficient to resist the disc ticket 410 from being displaced from the platter 412 during rotation in the optical disc reader 21 (FIG. 4). The entire platter and disc assembly may then placed into the optical disc drive 21 to position the machine readable surface 420 in a position where it can be read by the laser conventional disc reader.

The optical disc ticket 10 is preferably used as part of a system and is constructed to be inserted into a conventional optical disc drive of a processing device with display device such that the machine readable component may be decoded by the disc reader's laser optic subsystem to access the multimedia and advertising elements which may be displayed on the display device to the user. It will be appreciated that such disc ticket offers the flexibility of placing the advertising elements on either the first surface or as encoded data in the second surface and further offers the capability of updating such encoded data via an online network.

As the optical disc ticket includes encoded data which can store a significant amount of memorabilia and other information related to the event experience itself, it will encourage multiple viewings which in turn exposes the user to more occurrences to paid for advertising. Additionally, the use of an online component with updating features further increases the likelihood that users will encounter sponsor or other advertising information. It will be appreciated that the features of each embodiment are generally interchangeable and that the present invention is not limited by such examples. Further arrangements of the elements described herein do not detract from the spirit and the scope of the invention.

For example, it will be appreciated that a CD-R/W, DVD-ROM, DVD-RAM, optical business card, digital mini-disc or other suitable medium compatible with a conventional optical disc drive 21 may also be used (FIG. 4) and that capacities may range from 40–50 MB for a business card format, 140–230 MB for a mini-disc, 650–680 Mb for a single-sided CD-ROM, to 4.7 GB for a single sided DVD-ROM or other conventional capacity. It will also be appreciated that the authentication component 27, bar code scanners 64 and 108, authentication database 112, and verification processor 121 are added features and not necessary components of the optical disc ticket.

While the present invention has been described herein in terms of a number of preferred embodiments of an optical disc ticket, various changes and improvements may also be made to the invention without departing from the scope thereof.

What is claimed is:

1. An event entry and advertising medium for securing access to a preselected event having a designated entry point and for use in conjunction with a processing system having a decoding device and a display device, said medium comprising:
    a first surface defining an indicia receiving region including a ticket component;
    a second surface defining a machine readable region digitally encoded with a plurality of event related elements and at least one advertising element, said machine readable region constructed to be decoded by said decoding device to assemble a layout of said event related elements and said at least one advertising element; and
    a carrier positioning said first and second surfaces in an overlying arrangement with said ticket component being selectively presentable for presentation at said entry point to gain access to said preselected event and said machine readable region being selectively positionable within said decoder device to decode said digitally encoded elements to display said layout on said display device.

2. The medium as set forth in claim 1 wherein:
said ticket component includes an event title, an event date, an event time, and a seating assignment.

3. The medium as set forth in claim 1 wherein:
said machine readable region is defined by an optical storage surface readable by a conventional optical disk reader.

4. The medium as set forth in claim 1 wherein:
said carrier and said first and second surfaces form an integral disc body.

5. The medium as set forth in claim 1 wherein:
said indicia receiving region includes a set of visually perceptible indicia including said ticket component and at least one sponsor related indicia element and at least one event related indicia element.

6. The medium as set forth in claim 1 wherein:
said indicia receiving region further includes an authentication component including a bar code and a hologram.

7. The medium as set forth in claim 1 further including:
an instruction component within said indicia receiving region.

8. The medium as set forth in claim 1 wherein:
said indicia receiving region includes a set of visually perceptible indicia including said ticket component juxtaposed to an advertising component, an authentication component, and an instruction component with a background element underlying each of said components.

9. The medium as set forth in claim 1 wherein:
said event related elements includes a plurality of predetermined performer data elements and a plurality of predetermined venue data elements.

10. The medium as set forth in claim 1 wherein:
said machine readable component is a disc having an optical surface on one side and an opposing side providing a mounting surface; and
a plastic sleeve adhered to said mounting surface and dimensioned to receive said ticket component, said sleeve including a transparent window wherein said ticket component may be viewed therethrough.

11. The medium as set forth in claim 1 wherein:
said carrier is a foldable sleeve having a first pocket receiving said first surface and a second pocket receiving said second surface; and
wherein said first and second pockets may be folded to dispose said indicia receiving region and said machine readable region in a face to face arrangement.

12. The medium as set forth in claim 1 wherein:
said carrier includes a main body portion and at least one separable portion to be removed at an event point of entry.

13. The medium as set forth in claim 1 wherein:
said digitally encoded event related elements include audio data.

14. The medium as set forth in claim 1 wherein:
said digitally encoded event related elements include global network address data.

15. The medium as set forth in claim 1 wherein:
said digitally encoded event related elements include video data.

16. The medium as set forth in claim 1 wherein:
said digitally encoded event related elements include animation data.

17. The medium as set forth in claim 1 wherein:
said digitally encoded event related elements include text data.

18. The medium as set forth in claim 1 wherein:
said digitally encoded event related elements include multimedia data.

19. The medium as set forth in claim 1 wherein:
said digitally encoded event related elements include graphics data.

20. The medium as set forth in claim 1 wherein:
said digitally encoded event related elements include downloadable data.

21. The medium as set forth in claim 20 wherein:
said downloadable data are selectable from a set of free downloads, pay per download, or subscription downloads.

22. The medium as set forth in claim 1 wherein:
said machine readable region includes an application and a database loaded with said event related elements and said at least one advertising element, said application being programmed to access said database and retrieve at least one event related element and said at least one advertising element and assemble said elements in a display on said display device.

23. The medium as set forth in claim 1 wherein:
said at least one advertising element is selectively disposed on said layout with at least one of said event related elements as determined by a bidding process.

24. The medium as set forth in claim 1 wherein:
said digitally encoded event related elements are updatable over a network.

25. The medium as set forth in claim 1 wherein:
said digitally encoded advertising element is updatable over a network.

26. The medium as set forth in claim 1 wherein:
said carrier is an irregularly shaped optical disc; and
further including a platter including a recess having a complemental outline to said irregularly shaped optical disc, said platter including a marginal retention lip for receiving and carrying said irregularly shaped optical disc component to form a carrier and platter assembly whereby said carrier and platter assembly may be inserted into said decoding device to decode said machine readable region.

27. An advertising medium for gaining access through a point of entry at a preselected event and capable of being used in conjunction with a multimedia processing system including an optical disc reader and a display device, said medium comprising:
a disc body having a circular periphery and a central aperture and further including a first side defining an indicia receiving surface and an opposing second side defining an optical storage region, said disc body being compatible for placement in said optical disc reader;
a set of visually perceptible indicia including a ticket component with a seating arrangement, an advertising component, an authentication component, and an instruction component, each of said components overlying a background element on said indicia receiving surface; and
a display generation program with a database encoded into said optical region, said database being loaded with a plurality event related data elements and a plurality of sponsor related data elements, said program being programmed to access said elements in said database to generate at least one display on said display device, said display having a predetermined layout including a plurality of event related data elements and at least one sponsor related data element positioned among said event related data elements upon insertion of said disc body into said optical disc reader.

28. A method for gaining access to an event having a designated point of entry comprising:
obtaining an optical disc ticket having a carrier positioning a first surface defining an indicia receiving region including a ticket component in an overlying arrangement with a second surface defining a machine readable region digitally encoded with a plurality of event related elements and at least one advertising element, said machine readable region constructed to be decoded by a decoding device to assemble a layout of said event related elements and said at least one advertising element;
manipulating said carrier to present said ticket component to an attendant at said point of entry;
receiving acceptance of said optical disc ticket; and
entering said event through said point of entry.

29. The method as set forth in claim 28 further comprising:
viewing said ticket component to determine a seating assignment.

30. The method as set forth in claim 28 further comprising:
providing said optical disc ticket with said indicia receiving surface including a verification component; and
presenting said verification component to an attendant at said point of entry.

31. A method of accessing information stored on an event entry medium in the form of an optical disc ticket comprising:
obtaining an optical disc ticket having a carrier positioning a first surface defining an indicia receiving region including a ticket component in an overlying arrangement with a second surface defining a machine readable region digitally encoded with a plurality of event related elements and at least one advertising element, said machine readable region encoded with a program and a database loaded with said event related elements and said at least one advertising element, said machine readable region being constructed to be decoded by a decoding device to assemble a layout of said event related elements and said at least one advertising element;
providing a decoding device in communication with a display device;
inserting said optical disc ticket into said decoding device;
decoding said machine readable region to activate said program stored in said machine readable region to access said event related elements and said at least one advertising element in said database; and
assembling a layout including said event related elements and said at least one advertising element on said display device.

32. A method for creating an optical disc ticket with at least one advertising element comprising:
determining a venue and a performer for an event to be sponsored;
collecting a plurality of event related elements including venue data elements and performer data elements to be digitally encoded;
creating a draft display layout incorporating said event related elements;
determining at least one available position for at least one advertising element within said draft display layout;
creating at least one bidding package including a price for said at least one available position and associated digital memory requirements;
receiving at least one bid for said bidding package from a bidder;
determining a successful bidder;
implementing said at least one advertising element from said successful bidder into said display layout;
selecting a carrier with a first surface including an indicia receiving region and a second surface with machine readable region having a storage capacity capable of encoding said display layout with said at least one advertising element;
encoding said event related elements and said at least one advertising element into said machine readable region; and
adding a ticket component to said indicia receiving surface.

* * * * *